United States Patent
Garfinkel et al.

(10) Patent No.: US 10,396,413 B2
(45) Date of Patent: Aug. 27, 2019

(54) BATTERY COOLING FIN

(71) Applicant: FORD GLOBAL TECHNOLOGIES, LLC, Dearborn, MI (US)

(72) Inventors: George Albert Garfinkel, Westland, MI (US); John Peter Bilezikjian, Canton, MI (US); Dhanunjay Vejalla, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 186 days.

(21) Appl. No.: 15/004,129

(22) Filed: Jan. 22, 2016

(65) Prior Publication Data

US 2017/0214104 A1    Jul. 27, 2017

(51) Int. Cl.
*H01M 10/6551* (2014.01)
*H01M 10/6554* (2014.01)
*H01M 10/625* (2014.01)

(52) U.S. Cl.
CPC ..... *H01M 10/6551* (2015.04); *H01M 10/625* (2015.04); *H01M 10/6554* (2015.04); *H01M 2220/20* (2013.01)

(58) Field of Classification Search
CPC ......... H01M 10/6551; H01M 10/6555; H01M 10/6567; H01M 10/625; H01M 10/6554; F28F 1/325; F28F 3/02; F21V 29/74–76; F24C 15/24; F24C 1/08; H01L 23/3672; Y10T 29/49382
See application file for complete search history.

(56) References Cited

U.S. PATENT DOCUMENTS

| 3,312,277 | A | * | 4/1967 | Chitouras | F28F 3/048 165/185 |
| 4,187,905 | A | * | 2/1980 | Isenberg | F24B 7/005 165/181 |
| 5,511,887 | A | * | 4/1996 | Waskiewicz | F16C 35/0635 384/536 |
| 5,756,227 | A | * | 5/1998 | Suzuki | F28F 3/02 429/120 |
| 8,383,260 | B2 | | 2/2013 | Essinger et al. | |
| 8,574,740 | B2 | | 11/2013 | Quick et al. | |
| 2006/0220615 | A1 | * | 10/2006 | Kim | H01M 2/202 320/116 |
| 2010/0282444 | A1 | * | 11/2010 | Lin | F28D 15/0275 165/104.26 |
| 2011/0236740 | A1 | * | 9/2011 | Paolazzi | H01M 2/0245 429/120 |

(Continued)

FOREIGN PATENT DOCUMENTS

| KR | 101427045 B1 | 8/2014 |
| KR | 101545166 B1 | 8/2015 |
| WO | 2013111959 A1 | 8/2013 |

OTHER PUBLICATIONS

"Segment", The American Heritage Dictionary of the English Language, Houghton Mifflin, 6th edition, 2016. (Year: 2016).*

*Primary Examiner* — Sarah A. Slifka
*Assistant Examiner* — Lilia Nedialkova
(74) *Attorney, Agent, or Firm* — Carlson, Gaskey & Olds (57) ABSTRACT

A thermal fin according to an exemplary aspect of the present disclosure includes, among other things, a body, a leg that extends from the body and a thickened region of the body including a first thickness that is greater than a second thickness of another region of the body.

6 Claims, 5 Drawing Sheets

(56) References Cited

U.S. PATENT DOCUMENTS

| | | |
|---|---|---|
| 2012/0009455 A1 | 1/2012 | Yoon |
| 2012/0040223 A1 | 2/2012 | Odumodu |
| 2012/0177965 A1* | 7/2012 | Lee .................. H01M 10/5004 |
| | | 429/99 |
| 2012/0231315 A1* | 9/2012 | Yoon .................. H01M 10/657 |
| | | 429/120 |
| 2013/0045410 A1 | 2/2013 | Yang et al. |
| 2013/0071720 A1 | 3/2013 | Zahn |
| 2015/0147622 A1* | 5/2015 | Hwang ............. H01M 10/5004 |
| | | 429/120 |
| 2015/0266387 A1 | 9/2015 | Garfinkel et al. |

* cited by examiner

BATTERY COOLING FIN

TECHNICAL FIELD

This disclosure relates to a battery assembly for an electrified vehicle. The battery assembly includes a thermal fin for thermally managing battery cells of the assembly.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that must be periodically recharged to replenish the energy necessary to power these loads. The battery cells generate heat during charging and discharging operations. It is desirable to manage this heat to improve the capacity and life of the battery cells.

SUMMARY

A thermal fin according to an exemplary aspect of the present disclosure includes, among other things, a body, a leg that extends from the body and a thickened region of the body including a first thickness that is greater than a second thickness of another region of the body.

In a further non-limiting embodiment of the foregoing thermal fin, the leg is transverse to the body.

In a further non-limiting embodiment of either of the foregoing thermal fins, the thickened region is a portion of the body that is proximate to the leg.

In a further non-limiting embodiment of any of the foregoing thermal fins, the body is slotted and includes a plurality of fingers.

In a further non-limiting embodiment of any of the foregoing thermal fins, a slot is disposed between adjacent fingers of the plurality of fingers.

In a further non-limiting embodiment of any of the foregoing thermal fins, the thickened portion is established by a wall of a first fin portion and a wall of a second fin portion.

In a further non-limiting embodiment of any of the foregoing thermal fins, the first thickness is at least double the second thickness.

In a further non-limiting embodiment of any of the foregoing thermal fins, the body and the leg are extruded parts configured in a single-piece design.

In a further non-limiting embodiment of any of the foregoing thermal fins, the body and the leg are configured in a two-piece design including a first fin portion positioned back-to-back with a second fin portion.

In a further non-limiting embodiment of any of the foregoing thermal fins, the body includes a finger that forms an offset relative to a wall portion of the body.

A battery pack according to another exemplary aspect of the present disclosure includes, among other things, a battery assembly including a first battery cell, a second battery cell and a thermal fin positioned between the first battery cell and the second battery cell. The thermal fin includes a thickened region having an increased thermal conductivity compared to a first region of the thermal fin.

In a further non-limiting embodiment of the foregoing battery pack, the thermal fin includes a body and a leg that extends from the body.

In a further non-limiting embodiment of either of the foregoing battery packs, the body of the thermal fin is segmented into a plurality of fingers separated by slots.

In a further non-limiting embodiment of any of the foregoing battery packs, the thermal fin includes a first fin portion positioned back-to-back relative to a second fin portion.

In a further non-limiting embodiment of any of the foregoing battery packs, the battery assembly is positioned in proximity to a heat exchanger plate.

In a further non-limiting embodiment of any of the foregoing battery packs, a thermal interface material is disposed between a leg of the thermal fin and the heat exchanger plate.

In a further non-limiting embodiment of any of the foregoing battery packs, the thickened region is disposed near the leg of the thermal fin.

In a further non-limiting embodiment of any of the foregoing battery packs, the first battery cell, the second battery cell and the thermal fin are held within a frame.

In a further non-limiting embodiment of any of the foregoing battery packs, the thermal fin includes a first fin portion and a second fin portion. Each of the first fin portion and the second fin portion include fingers and slots, the fingers of the first fin portion nesting within the slots of the second fin portion and the fingers of the second fin portion nesting within the slots of the first fin portion when the first fin portion is positioned back-to-back with the second fin portion.

A method according to another exemplary aspect of the present disclosure includes, among other things, positioning a thermal fin between a first battery cell and a second battery cell of a battery assembly of an electrified vehicle, the thermal fin having a first region with a first thermal conductivity and a thickened region with a second thermal conductivity greater than the first thermal conductivity.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a battery assembly for an electrified vehicle. The battery assembly includes a thermal fin positioned between adjacent battery cells of the assembly. The thermal fin is configured to dissipate heat from the battery cells to a location external to the battery cells. The thermal fin includes a body, a leg that extends from the body, and a thickened region having a thickness that is greater than the thicknesses of the remaining portions of the thermal fin. In some embodiments, the thermal fin includes a two-piece design. In other embodiments, the thermal fin includes a single piece design. These and other features are discussed in greater detail in the following paragraphs of this detailed description.

Figure 1:
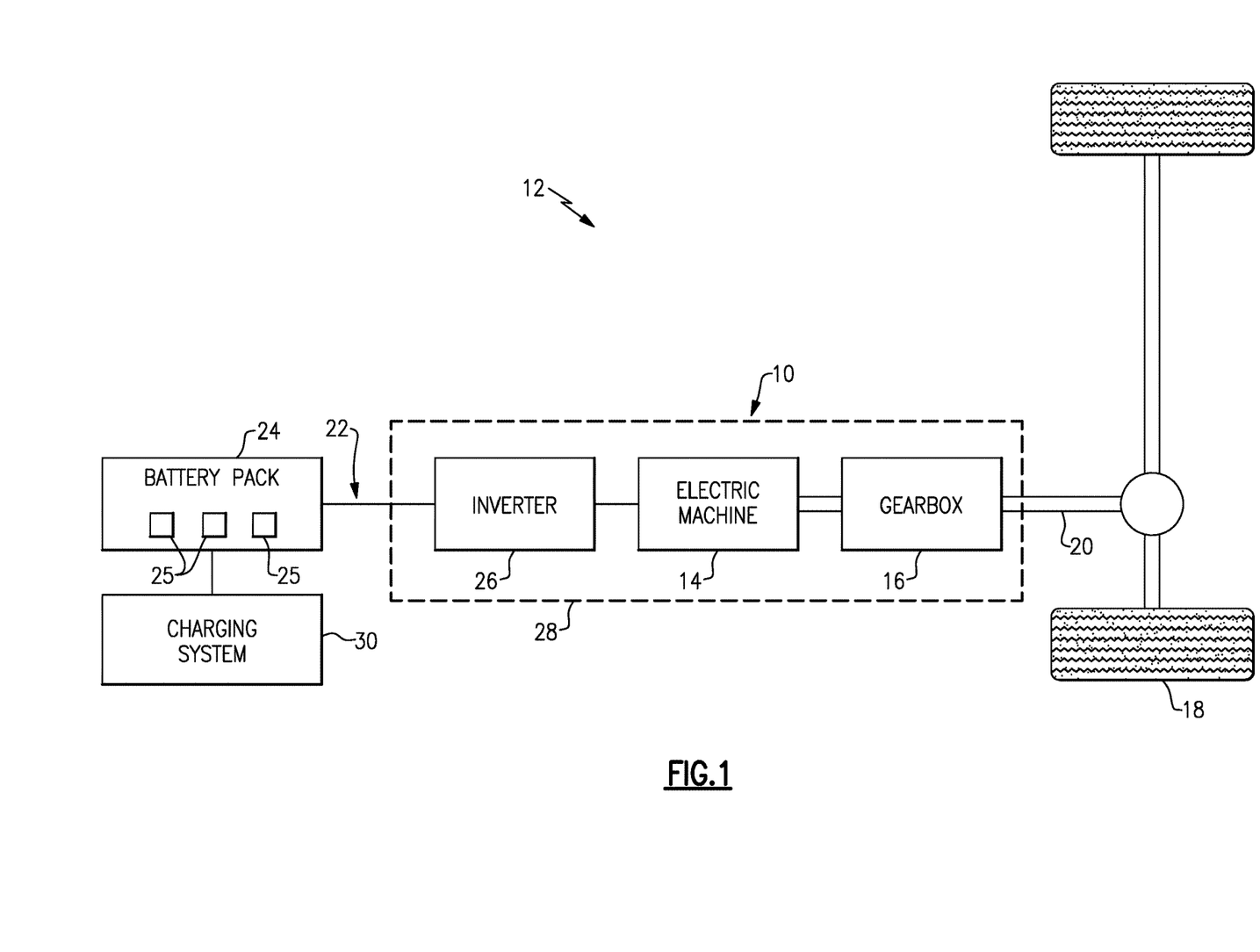
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's), full hybrid electric vehicles (FHEV's) or mild hybrid electric vehicles (mHEV's). Therefore, although not shown in this embodiment, the electrified vehicle 12 could be equipped with an internal combustion engine that can be employed either alone or in combination with other energy sources to propel the electrified vehicle 12.

In one non-limiting embodiment, the electrified vehicle 12 is a full electric vehicle propelled solely through electric power, such as by an electric machine 14, without assistance from an internal combustion engine. The electric machine 14 may operate as an electric motor or an electric generator. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 are collectively referred to as a transaxle 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for charging the energy storage devices (e.g., battery cells) of the battery pack 24. The charging system 30 may be connected to an external power source (not shown) for receiving and distributing power. The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
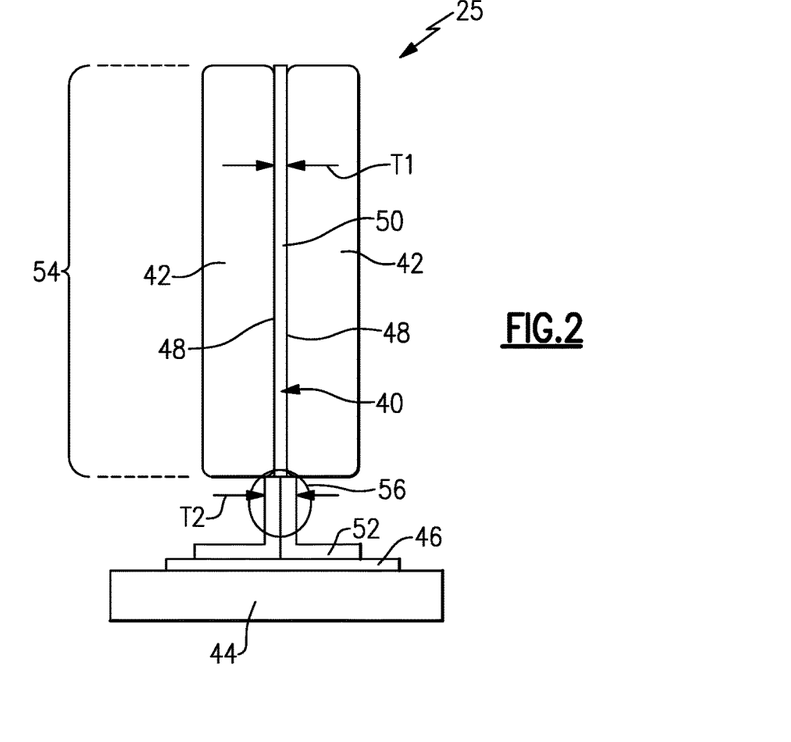
FIG. 2 illustrates portions of a battery assembly of an electrified vehicle.

FIG. 2 illustrates select portions of a battery assembly 25 that can be employed within a battery pack of an electrified vehicle. For example, the exemplary battery assembly 25 could be part of the battery pack 24 of the electrified vehicle 12 of FIG. 1. The battery assembly 25 includes a thermal fin 40 disposed between adjacent battery cells 42. Although two battery cells 42 are depicted in FIG. 2, the battery assembly 25 could include additional battery cells within the scope of this disclosure. For example, in one non-limiting embodiment, a plurality of battery cells 42 are stacked together to construct the battery assembly 25, with one thermal fin 40 provided for every two battery cells 42.

In one non-limiting embodiment, the battery cells 42 are pouch cells. However, battery cells having other geometries (prismatic, cylindrical, etc.) and/or chemistries (lithium-ion, nickel-metal hydride, lead-acid, etc.) could alternatively be utilized within the scope of this disclosure.

The battery cells 42 and the thermal fin 40 are positioned proximate to a heat exchanger plate 44, sometimes referred to as a cold plate. The heat exchanger plate 44 is configured to conduct heat out of the battery cells 42. In other words, the heat exchanger plate 44 acts as a heat sink to remove heat from the heat sources (i.e., the battery cells 42) during certain conditions. The heat exchanger plate 44 could alternatively be configured to add heat to the battery cells 42, such as during relatively cold ambient conditions. Although not shown, the heat exchanger plate 44 may include an internal cooling circuit for circulating a fluid, such as coolant or refrigerant, for thermally conditioning the battery cells 42.

In another non-limiting embodiment, a thermal interface material (TIM) 46 is positioned between the thermal fin 40 and the heat exchanger plate 44. The TIM 46 maintains thermal contact between the thermal fin 40 and the heat exchanger plate 44 and increases the thermal conductivity between these neighboring components during heat transfer events. The TIM 46 may be any known thermally conductive material.

The thermal fin 40 is positioned between two battery cells 42 in order to conduct thermal energy to or from the heat exchanger plate 44. The thermal fin 40 is in direct contact with side faces 48 of two neighboring battery cells 42. In one non-limiting embodiment, the thermal fin 40 is configured to remove heat from the battery cells 42 and conduct the heat to the heat exchanger plate 44. In another non-limiting embodiment, the thermal fin 40 is configured to add heat to the battery cells 42 which is conducted from the heat exchanger plate 44.

The thermal fin 40 includes a body 50 and a leg 52 that extends from the body 50. In one non-limiting embodiment, the leg 52 extends transversely from the body 50. The body 50 includes a first region 54 and a thickened region 56. The first region 54 of the body 50 is sandwiched between the adjacent battery cells 42. The thickened region 56 is positioned between the battery cells 42 and the TIM 46 and is not sandwiched between the adjacent battery cells 42.

The thickened region 56 of the thermal fin 40 is located at a critical area of heat transfer between the battery cells 42 and the heat exchanger plate 44. The thermal conductivity of the thermal fin 40 is effectively increased at this critical heat transfer area by providing the thickened region 56.

The thickened region 56 of the body 50 includes a thickness T2 that is greater than a thickness T1 of the first region 54 of the body 50. In one non-limiting embodiment, the thickness T2 of the thickened region 56 is at least double the thickness T1 of the first region 54 of the body 50. However, the thickness T2 could be any thickness that is greater than the thickness T1. By maintaining the relatively small thickness T1 at the first region 54 of the body 50 (i.e., the region sandwiched between the battery cells 42), the proposed fin design achieves enhanced heat transfer without negatively impacting packaging space or overall design length of the battery assembly 25.

Figure 3:
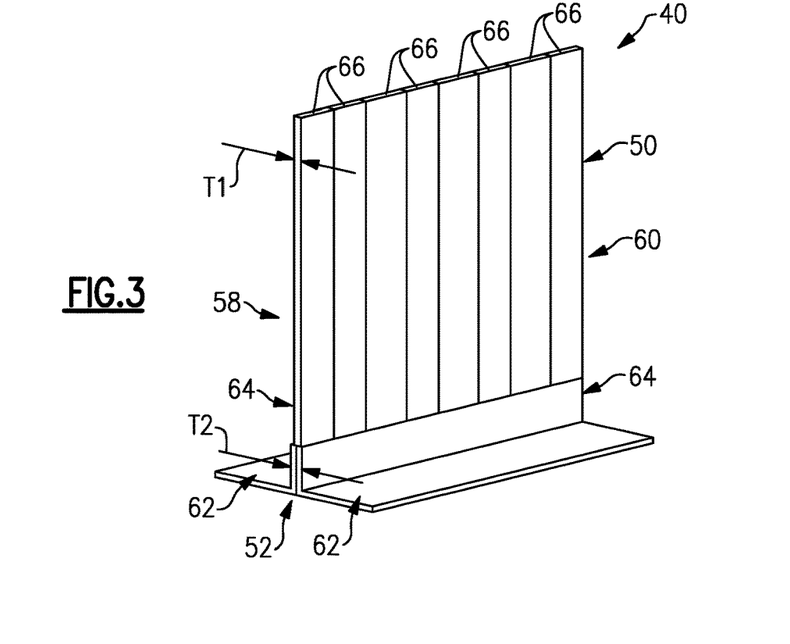
FIG. 3 illustrates a two-piece thermal fin according to a first embodiment of this disclosure.
Figure 4A:
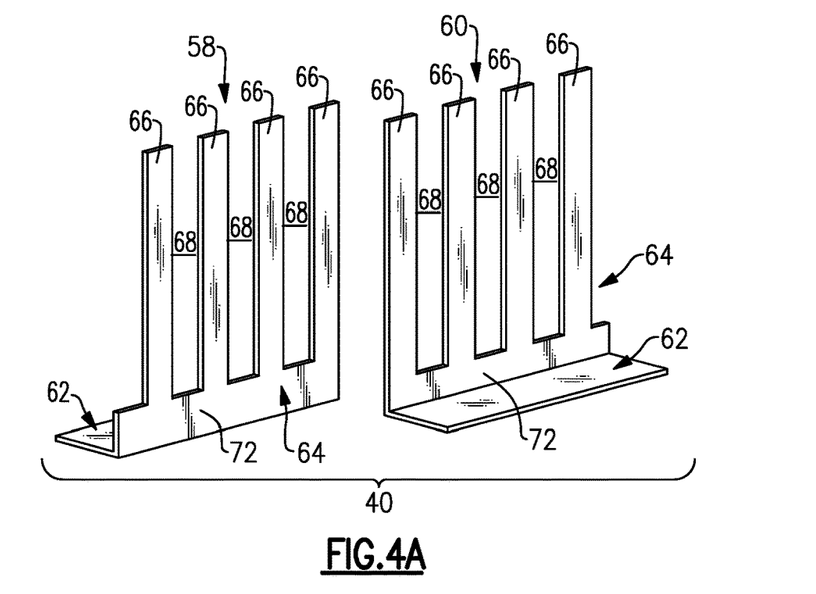
FIG. 4A is an exploded isometric view of the thermal fin of FIG. 3.
Figure 4B:
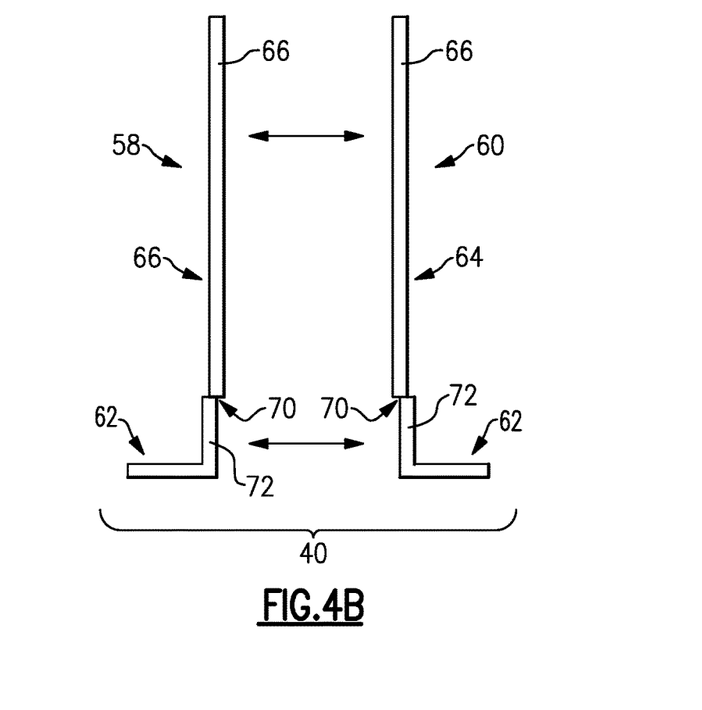
FIG. 4B is an exploded side view of the thermal fin of FIG. 3.

FIGS. 3, 4A and 4B illustrate an exemplary thermal fin 40 that can be utilized within the battery assembly 25 described above. In this non-limiting embodiment, the thermal fin 40 is configured as a double fin, or two-piece, design that includes a first fin portion 58 positioned back-to-back with a second fin portion 60. The first and second fin portions 58, 60 are identical components (i.e., same size, shape and overall design) but are rotated 180° relative to one another to enable the back-to-back positioning.

In one non-limiting embodiment, the thermal fin 40 is made of aluminum. However, other materials are also contemplated within the scope of this disclosure.

The first fin portion 58 and the second fin portion 60 each include a base 62 and a wall 64. The walls 64 protrude upwardly from the bases 62. In one non-limiting embodiment, the walls 64 are slotted. For example, in one non-limiting embodiment, each wall 64 includes a plurality of fingers 66 that are separated from one another by slots 68. When placed back-to-back, the fingers 66 of the first fin portion 58 are aligned with the slots 68 (best shown in FIG. 4B) of the second fin portion 60 (and vice versa). Therefore, to assemble the thermal fin 40, the fingers 66 of the first fin portion 58 are received within the slots 68 of the second fin portion 60 and the fingers 66 of the second fin portion 60 are received within the slots 68 of the first fin portion 58. Once positioned back-to-back, the first fin portion 58 and the second fin portion 60 can optionally be attached to one another (e.g., welded, etc.).

The walls 64 of the first and second fin portions 58, 60 establish the body 50 of the thermal fin 40, and the bases 62 establish the leg 52 of the thermal fin 40. The body 50 includes the thickness T1 in the region including the fingers 66 and the slots 68 and includes the thickness T2 in the region where the walls 64 abut one another adjacent to the bases 62. The thickness T2 is a greater thickness than the thickness T1.

Referring now primarily to FIG. 4B, the fingers 66 of the first and second fin portions 58, 60 may form an offset 70 relative to a foundation wall portion 72 of each wall 64. The fingers 66 are bent to create the offset 70, in one non-limiting embodiment. The offset 70 can help nest the fingers 66 within the slots 68 of the opposing fin portion 58, 60.

Figure 5:
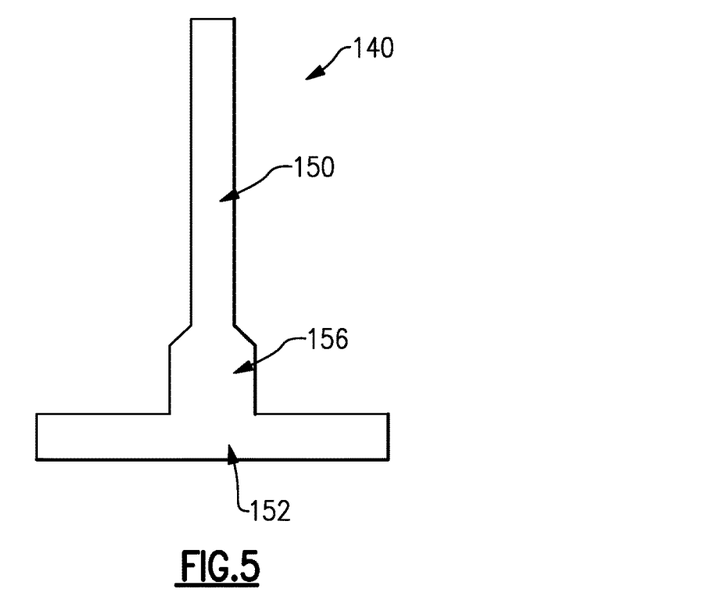
FIG. 5 illustrates a thermal fin according to another embodiment of this disclosure.

FIG. 5 illustrates another exemplary thermal fin 140. In this embodiment, the thermal fin 140 is an extruded, single-piece part configured in a T-shape. The thermal fin 140 includes a body 150 and a leg 152 that extends from the body 150. A thickened region 156 of the body 150 is positioned near the leg 152. The leg 152 extends outwardly on both sides of the body 150.

Figure 6:
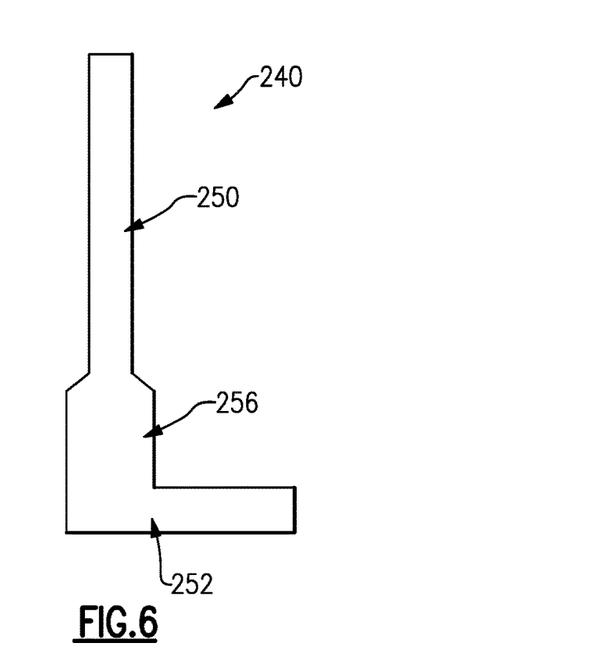
FIG. 6 illustrates a thermal fin according to yet another embodiment of this disclosure.

FIG. 6 illustrates yet another exemplary thermal fin 240. In this embodiment, the thermal fin 240 is an extruded, single-piece part configured in an L-shape. The thermal fin 240 includes a body 250 and a leg 252 that extends from the body 250. A thickened region 256 of the body 250 is positioned near the leg 252. The leg 252 extends outwardly on only one side of the body 250.

FIGS. 7A-7D illustrate another battery assembly 325. The battery assembly 325 of this exemplary embodiment includes a thermal fin 340 disposed between adjacent battery cells 342. The thermal fin 340 and battery cells 342 are held within a frame 380. In one non-limiting embodiment, the frame 380 is made from a plastic material, which can be either thermally conducting or thermally non-conductive, and the thermal fin 340 is made of a metallic material.

The frame 380, the battery cells 342 and the thermal fin 340 are positioned proximate to a heat exchanger plate 344. The heat exchanger plate 344 is configured to conduct heat out of the battery cells 342. A thermal interface material (TIM) 346 may be positioned between the thermal fin 340 and the heat exchanger plate 344.

The thermal fin 340 is positioned between two battery cells 342 in order to conduct thermal energy to or from the heat exchanger plate 344. In one non-limiting embodiment, the thermal fin 340 is in direct contact with side faces 348 of the two neighboring battery cells 342 and is in direct contact with bottom faces 382 of the battery cells 342. In this way, the thermal fin 340 is configured to conduct heat in a both a first direction D1 (here a vertical direction) and a second direction D2 (here a horizontal direction).

The thermal fin 340 may include a body 350 and a first leg 352A and a second leg 352B that both extend from the body 350. The body 350 contacts the side faces 348 of the battery cells 342 to conduct heat in the first direction D1. The first leg 352A contacts the bottom faces 382 of the battery cells 342 to conduct heat in the direction D2. The first leg 352A could be any shape to correspond to any shape of the bottom faces 382 of the battery cells 342. In one non-limiting embodiment, the first leg 352A extends across an entire length L of the bottom faces 382 of the battery cells 342 (see FIG. 7B). In another non-limiting embodiment, the first leg 352A is segmented such that it only contacts the bottom faces 382 along distinct portions of the length L (see FIGS. 7C and 7D). In such embodiments, walls 390 of the frame 380 extend between segments 392 of the first leg 352A The second leg 352B may extend in parallel to the first leg 352A but is positioned proximate the heat exchanger plate 344 rather than the bottom faces 382 of the battery cells 342. A wall 384 of the frame 380 may be positioned between the first leg 352A and the second leg 352B. The second leg 352B may be solid along its length (see FIGS. 7B and 7D) or could alternatively be segmented (see FIG. 7C).

Figure 7A:
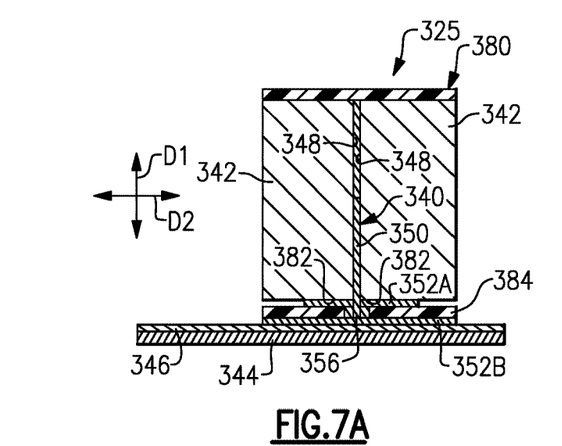
FIGS. 7A, 7B, 7C and 7D illustrate portions of another battery assembly.
Figure 7B:
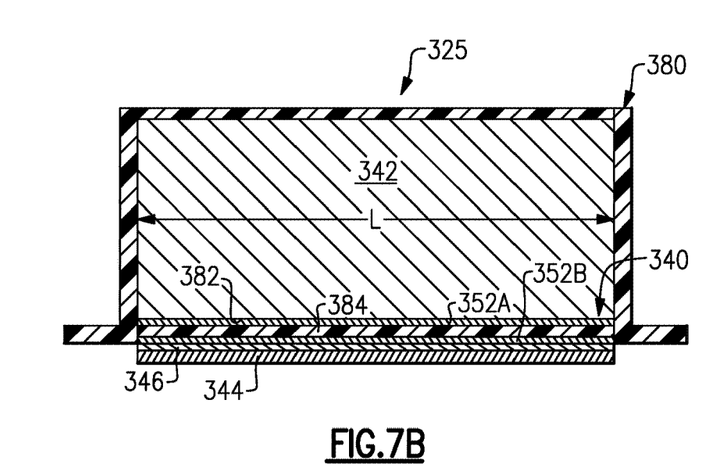
Figure 7C:
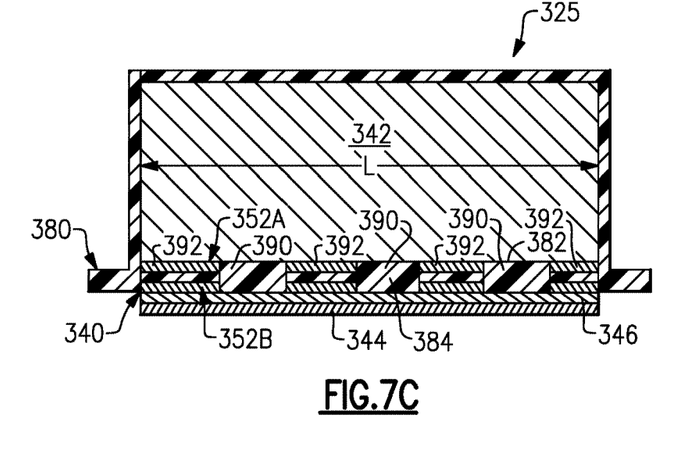
Figure 7D:
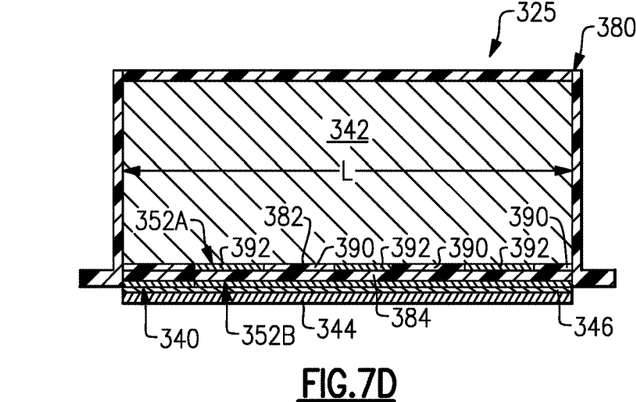

In another non-limiting embodiment, the body 350 includes a thickened region 356 (see FIG. 7A). The thickened region 356 is positioned between the first leg 352A and the second leg 352B. The thickened region 356 of the thermal fin 340 is located at a critical area of heat transfer between the battery cells 342 and the heat exchanger plate 344. The thermal conductivity of the thermal fin 340 is effectively increased at this critical heat transfer area by providing the thickened region 356. The thickened region 356 of the body 350 includes a greater thickness that the portion of the body 350 that is disposed between the battery cells 342, in one non-limiting embodiment.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a battery assembly including:
        a first battery cell;
        a second battery cell;
        a thermal fin positioned between said first battery cell and said second battery cell, said thermal fin including a thickened region having an increased thermal conductivity compared to a first region of said thermal fin,
        wherein said thermal fin is a separate component from a casing of either of said first battery cell and said second battery cell; and
        said thermal fin is segmented into a plurality of fingers, and each of said plurality of fingers contacts a side face of each of said first battery cell and said second battery cell,
        wherein said thermal fin includes a first fin portion and a second fin portion, and each of said first fin portion and said second fin portion includes fingers and slots, said fingers of said first fin portion nesting within said slots of said second fin portion and said fingers of said second fin portion nesting within said slots of said first fin portion when said first fin portion is positioned back-to-back with said second fin portion.

2. The battery pack as recited in claim 1, wherein said thermal fin includes a body and a leg that extends from said body.

3. The battery pack as recited in claim 1, wherein said battery assembly is positioned in proximity to a heat exchanger plate.

4. The battery pack as recited in claim 3, comprising a thermal interface material disposed between a leg of said thermal fin and said heat exchanger plate.

5. The battery pack as recited in claim 4, wherein said thickened region is disposed near said leg of said thermal fin.

6. The battery pack as recited in claim 1, wherein said first battery cell, said second battery cell, and said thermal fin are held within a plastic frame.

* * * * *